United States Patent Office 3,819,757
Patented June 25, 1974

3,819,757
COATING COMPOSITIONS
Jorg Dorffel, Lippramsdorf, and Uwe Biethan, Marl, Germany, assignors to Chemische Werke Huels Aktiengesellschaft, Marl, Germany
No Drawing. Filed Aug. 28, 1972, Ser. No. 283,965
Claims priority, application Germany, Sept. 18, 1971, P 21 46 754.9
Int. Cl. C08g 37/34
U.S. Cl. 260—850
8 Claims

ABSTRACT OF THE DISCLOSURE

Coating compositions containing, as the binder
(A) 45–15% by weight of an aminoplast or a low-molecular precursor thereof; and
(B) 55–85% by weight of at least difunctional esters containing predominantly hydroxyl groups and optionally carboxyl groups as the functional groups and having an average molecular weight of less than 600 and produced by the esterification of
   I. an alcohol reactant consisting essentially of:
      (1) 0–50 molar percent of one or more aliphatic polyols of 3 or 4 hydroxyl groups and 3–6 carbon atoms, and
      (2) 100–50 molar percent of a diol component consisting essentially of: (a) at least 70 molar percent of one or both of ethylene glycol and 1,2-propanediol, and (b) up to 30 molar percent of one or more other aliphatic or cycloaliphatic diols whose hydroxyl groups are separated by 2–8 carbon atoms, and 0 to 2 of the carbon atoms in the chain are substituted by oxygen atoms which are separated from each other and from the hydroxyl groups by at least 2 carbon atoms, and
   II. an acid mixture consisting essentially of:
      (1) 80–200 molar percent of one or more aromatic or cycloaliphatic dicarboxylic acids whose carboxyl groups are positioned ortho or meta or a functional acid derivative thereof convertible to an ester of the alcohol reactant, and
      (2) 20–80 molar percent of at least one saturated aliphatic dicarboxylic acid of 4–12 carbon atoms or a functional acid derivative thereof convertible to an ester of the alcohol reactant are cured at low temperatures without loss of baking stability employing as curing catalyst 0.7–2% by weight of one or both of maleic acid and oxalic acid.

BACKGROUND OF THE INVENTION

This invention relates to novel low temperature curing coating compositions.

Application Ser. No. 135,691, filed Apr. 20, 1971, relates to coating compositions containing, as the binder (A) 45–15% by weight of an aminoplast or a low-molecular precursor thereof; and
(B) 55–85% by weight of at least difunctional esters containing predominantly hydroxyl groups and optionally carboxyl groups as the functional groups and having an average molecular weight of less than 600 and produced by the esterification of I. an alcohol reactant consisting essentially of:
   (1) 0–50 molar percent of one or more aliphatic polyols of 3 or 4 hydroxyl groups and 3–6 carbon atoms, and
   (2) 100–50 molar percent of a diol component consisting essentially of: (a) at least 70 molar percent of one or both of ethylene glycol and 1,2-propanediol, and (b) up to 30 molar percent of one or more other aliphatic or cycloaliphatic diols whose hydroxyl groups are separated by 2–8 carbon atoms, and 0 to 2 of the carbon atoms in the chain are substituted by oxygen atoms which are separated from each other and from the hydroxyl groups by at least 2 carbon atoms, and
II. an acid mixture consisting essentially of:
   (1) 80–20 molar percent of one or more aromatic or cycloaliphatic dicarboxylic acids whose carboxyl groups are positioned ortho or meta or a functional acid derivative thereof convertible to an ester of the alcohol reactant, and
   (2) 20–80 molar percent of at least one saturated aliphatic dicarboxylic acid of 4–12 carbon atoms or a functional acid derivative thereof convertible to an ester of the alcohol reactant.

Because of the low viscosity of the binder, coating compositions can be produced which can be applied with low amounts of or in the absence of solvent. After baking, coatings are obtained having superior properties.

For the curing of these varnishes at low temperatures, p-toluenesulfonic acid is customarily added as the cross-linking catalyst. However, this additive has the disadvantage that the baking stability of the varnish coatings is reduced.

In U.S. Pat. 2,683,100, maleic acid, phthalic anhydride, ammonium biphosphate, styrene dichloride, bromonaphthols, and 2,4-dichloro-1-naphthol are described as the catalysts for the cross-linking of polyesters on the basis of terephthalic acid, an aliphatic dicarboxylic acid, and ethylene glycol with, for example, hexakis[methoxymethyl]melamine. From the disclosure of this patent, it is surprising that, for the present binder system, only one of the enumerated compounds can advantageously be utilized as the catalyst, whereas the other compounds, disclosed as being equivalent in their effect, cannot be employed.

In German Unexamined Published Application DOS 1,644,815, maleic acid and p-toluenesulfonic acid, inter alia, are described as catalysts for reducing the baking temperature of coating compositions formed from polycondensation products having hydroxyl and/or carboxyl groups and of reaction products from a polyamine, polyalcohol or an amino alcohol, and N-alkoxymethyl isocyanates, optionally with the addition of melamine or ureaformaldehyde resins. In this reference, maleic acid and p-toluenesulfonic acid, for example, are employed as equivalents. However, in the binder system of the present invention, these compounds result in diametrically opposed characteristics with respect to baking stability.

It is an object of this invention to provide a catalyst for the above-described binder system which does not impair the baking stability.

SUMMARY OF THE INVENTION

According to this invention, there is provided coating compositions defined herein containing as catalyst for the binder about 0.7–2.0% by weight of one or both of maleic acid and/or oxalic acid.

DETAILED DISCUSSION

The catalyst preferably is present in amounts of about 1.0–1.5% by weight. Maleic acid is especially effective.

The coating compositions employed herein can be cured with p-toluenesulfonic acid, usually within 30 minutes at 150° C. When exposing the thus-cured systems to elevated temperatures, or baking them for a longer period of time at higher temperatures, a partial disintegration of the film network occurs, resulting in deficient film properties, as well as in a more or less marked yellow discoloration. This defective thermal stability is called minor baking stability. This phenomenon could have disadvantageous effects when the baking procedure is impaired, especially when the belt comes to a standstill when coating according to the coil coating procedure.

The attempt to obtain using other customary catalysts, e.g., tartaric acid, monobutyl phosphate and phosphoric acid, systems which result, after baking in a wide temperature range, in coatings having invariably satisfactory film properties, yielded unsatisfactory results since, even after baking for one-half hour at temperatures of above 200° C., soft and insufficiently cross-linked films were obtained. Use of 1–2% by weight of phthalic acid, phthalic anhydride, terephthalic acid, malonic acid, succinic acid, glutaric acid, adipic acid and maleic anhydride yielded satisfactory film hardness values only after baking for one-half hour at temperatures of above 220° C. These temperatures usually are not employed over a time period of 30 minutes during sheet metal coating, for which purpose the coating compositions of this invention are preferably utilized.

Coatings cured with the catalysts of the present invention exhibit the same satisfactory properties as the coatings cured with the previously customary catalyst, p-toluenesulfonic acid and surprisingly exhibit an excellent baking stability.

When using oxalic acid as the catalyst, a temperature of 180° C. proved to be the optimum.

The maleic acid and/or oxalic acid can be admixed with the coating composition shortly prior to the baking step. However, it is preferred to dissolve the dicarboxylic acid in the ester and/or in the ester mixture and thereafter mix with the aminoplast.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

Production of the Ester

A mixture of 65.1 g. of ethylene glycol (1.05 mol), 79.8 g. of 1,2-propanediol (1.05 mol), 74 g. of phthalic anhydride (0.5 mol), and 73 g. of adipic acid (0.5 mol) is heated under agitation and while passing a gentle nitrogen stream through the mixture, in accordance with the following time-temperature plan: 2 hours at 140° C.; 2 hours at 160° C.; 4 hours at 180° C.; 4 hours at 190° C.; and 4 hours at 200° C. During this time, 25 ml. of water in total are driven off. The clear, colorless ester mixture has an acid number of 2.5 mg. KOH/g. and a hydroxyl number of 454 mg. KOH/g., corresponding to an average molecular weight of 245.

Production of a Varnish

The thus-obtained ester mixture is mixed with the amount set forth in the table below of the acidic catalyst and stirred at room temperature until complete dissolution has occurred. Of the thus-obtained mixture, 70.3–70.6 parts is mixed with 29.7 parts of a commercially available etherified hexamethylolmelamine which is liquid in substance.

Production of an Enamel

For preparing an enamel, the clear varnish, optionally after adding a small amount of solvent, is pigmented with titanium dioxide in the desired binder-pigment ratio (for example 2:1).

Production and Testing of the Coatings

For testing purposes, the clear varnish or the enamel, respectively, is applied to deep-drawn steel sheets of a thickness of 1 mm. and glass panes at room temperature and then baked. The thickness of the film coatings being tested is, in all examples, 30–40μ.

The hardness test is performed according to German Industrial Standard DIN 53,157. The elasticity is measured according to DIN 53,156. The impact deformability is determined by the impact depression device 226/D (Erichsen, Hemer-Sundwig). In this device, a hemisphere having a radius of 10 mm. is suddenly impressed into the metal sheet from the back of the varnish side by means of a falling weight. By varying the falling height of the weight, the depression can be varied. The depression value (in mm.) is indicated at which the varnish layer begins to tear. The adhesion is tested by measuring the deep drawability of the varnish over the center of a 90° cross cut. The depression value is indicated (in mm.) at which the coating is detached from the test metal sheet.

The two figures appearing in the column "Solvent Resistance" characterize the swelling and scratch sensitivity of the baked varnish film after 15 minutes of constant exposure to xylene at room temperature. The first number is the swelling in three evaluation stages (1=unswelled; 2=slightly swelled; and 3=greatly swelled) and the second number is the scratch sensitivity, likewise in three evaluation stages (1=scratchproof; 2=minor scratch resistance; and 3=no scratch resistance).

| Example number | Amount and type of catalyst | Weight ratio, ester:aminoplast:TiO$_2$ | Baking conditions (° C./min.) | Hardness, acc. to DIN 53157 (sec.) | Deep drawability, DIN 53156 (mm.) | Impact depression (mm.) | Adhesion (mm.) | Solvent resistance | Appearance of coating |
|---|---|---|---|---|---|---|---|---|---|
| 1 | 0.5% by wt. p-toluene-sulfonic acid | 70:30:50 | 140/30 | 168 | 7.3 | 4 | 2.3 | 1/1 | White. |
| | | | 150/30 | 166 | 7.2 | 5 | 3.7 | 1/1 | Do. |
| | | | 165/30 | 98 | 6.2 | 2 | 3.1 | 1/1 | Do. |
| | | | 180/30 | 70 | 4.0 | <1 | 1.9 | 1/1 | Yellow. |
| | | | 200/30 | 84 | 1.5 | <1 | 1.1 | 1/1 | Yellow-brown. |
| | | | 220/30 | 97 | 0.9 | <1 | 0.8 | 1/1 | Brown. |
| 2 | 1% by wt. monobutyl phosphate | 70:30:50 | 150/30 | 11 | 10.8 | >5 | 10.0 | 2/3 | White. |
| | | | 165/30 | 16 | 9.7 | >5 | 9.9 | 2/3 | Do. |
| | | | 180/30 | 58 | 8.7 | >5 | | 1/2 | Do. |
| | | | 200/30 | 133 | 7.6 | 5 | 6.5 | 1/1 | Do. |
| | | | 220/30 | 175 | 6.4 | 4 | | 1/1 | Do. |
| 3 | 1% by wt. H$_3$PO$_4$ | 70:30:0 | 150/30 | 53 | 9.4 | >5 | 9.5 | 1/1 | Clear. |
| | | | 165/30 | 80 | 9.3 | 5 | 9.3 | 1/1 | Do. |
| | | | 180/30 | 104 | 9.0 | 5 | 9.0 | 1/1 | Do. |
| | | | 200/30 | 101 | 7.3 | 3 | 6.4 | 1/1 | Do. |
| | | | 220/30 | 149 | 6.4 | <1 | 5.9 | 1/1 | Yellowish. |

TABLE—Continued

| Example number | Amount and type of catalyst | Weight ratio, ester:aminoplast:TiO$_2$ | Baking conditions (° C./min.) | Hardness, acc. to DIN 53157 (sec.) | Deep drawability, DIN 53156 (mm.) | Impact depression (mm.) | Adhesion (mm.) | Solvent resistance | Appearance of coating |
|---|---|---|---|---|---|---|---|---|---|
| 4 | 1% by wt. phthalic anhydride | 70:30:0 | 150/30 | | | Films are tacky | | | |
| | | | 165/30 | | | Films are tacky | | | |
| | | | 180/30 | 16 | >10 | >5 | | 2/3 | Clear. |
| | | | 200/30 | 17 | >10 | >5 | | 2/3 | Do. |
| | | | 220/30 | 25 | >10 | >5 | | 2/3 | Yellowish. |
| 5 | 1% by wt. maleic acid | 70:30:50 | 150/30 | 156 | 8.4 | 5 | 6.2 | 1/1 | White |
| | | | 165/30 | 160 | 8.4 | 5 | 7.8 | 1/1 | Do. |
| | | | 180/30 | 162 | 8.2 | 5 | 6.6 | 1/1 | Do. |
| | | | 200/30 | 156 | 8.1 | 5 | 6.4 | 1/1 | Do. |
| | | | 220/30 | 159 | 7.8 | 5 | 6.6 | 1/1 | Do. |
| 6 | 1% by wt. maleic acid | 70:30:0 | 150/30 | 173 | 9.4 | >5 | 9.4 | 1/1 | Clear. |
| | | | 165/30 | 170 | 9.6 | >5 | 9.5 | 1/1 | Do. |
| | | | 180/30 | 176 | 9.4 | >5 | 9.4 | 1/1 | Do. |
| | | | 200/30 | 166 | 9.8 | >5 | 9.3 | 1/1 | Do. |
| | | | 220/30 | 165 | 9.9 | >5 | 9.4 | 1/1 | Do. |
| 7 | 1% by wt. oxalic acid | 70:30:50 | 150/30 | 92 | 8.8 | 5 | 8.3 | 1/2 | White. |
| | | | 165/30 | 121 | 8.5 | >5 | 8.0 | 1/1 | Do. |
| | | | 180/30 | 157 | 7.9 | 5 | 6.1 | 1/1 | Do. |
| | | | 200/30 | 173 | 7.5 | 5 | 7.4 | 1/1 | Do. |
| | | | 220/30 | 178 | 6.3 | 5 | 6.0 | 1/1 | Slightly yellow. |
| 8 | 1% by wt. phthalic acid | 70:30:50 | 150/30 | 28 | 9.5 | >5 | 9.4 | 2/2 | White. |
| | | | 165/30 | 34 | 9.5 | >5 | 9.9 | 2/2 | Do. |
| | | | 180/30 | 56 | 9.4 | >5 | 9.5 | 2/2 | Do. |
| | | | 200/30 | 84 | 8.9 | >5 | 8.1 | 2/1 | Do. |
| | | | 220/30 | 149 | 7.6 | 5 | 7.2 | 1/1 | Do. |
| 9 | 1% by wt. adipic acid | 70:30:50 | 150/30 | | | Tacky films | | | |
| | | | 165/30 | | | Tacky films | | | |
| | | | 180/30 | 12 | 9.6 | >5 | 9.5 | 2/3 | White. |
| | | | 200/30 | 59 | 8.5 | 5 | 7.6 | 2/2 | Do. |
| | | | 220/30 | 96 | 6.7 | 4 | 6.4 | 2/1 | Do. |
| 10 | 1% by wt. maleic anhydride | 70:30:0 | 150/30 | 19 | >10 | >5 | >10 | 2/2 | Clear. |
| | | | 165/30 | 19 | >10 | >5 | >10 | 2/2 | Do. |
| | | | 180/30 | 21 | >10 | >5 | >10 | 2/2 | Do. |
| | | | 200/30 | 30 | >10 | >5 | >10 | 2/2 | Yellow. |
| | | | 220/30 | 41 | >10 | >5 | 9.5 | 2/2 | Do. |

The preceding examples can be repeated with similar success by substituting the generically or specifically dedescribed reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a heat curing coating composition containing, as the binder
   (A) 45–15% by weight of an aminoplast or a low-molecular precursor thereof; and
   (B) 55–85% by weight of at least difunctional esters containing predominantly hydroxyl groups and optionally carboxyl groups as the functional groups and having an average molecular weight of less than 600 and produced by the esterification of
      I. an alcohol reactant consisting essentially of:
         (1) 0–50 molar percent of one or more aliphatic polyols of 3 or 4 hydroxyl groups and 3–6 carbon atoms, and
         (2) 100–50 molar percent of a diol component consisting essentially of: (a) at least 70 molar percent of one or both of ethylene glycol and 1,2-propanediol, and (b) up to 30 molar percent of one or more other aliphatic or cycloaliphatic diols whose hydroxyl groups are separated by 2–8 carbon atoms, and 0 to 2 of the carbon atoms in the chain are substituted by oxygen atoms which are separated from each other and from the hydroxyl groups by at least 2 carbon atoms, and
      II. an acid mixture consisting essentially of:
         (1) 80–20 molar percent of one or more aromatic or cycloaliphatic dicarboxylic acids whose carboxyl groups are positioned ortho or meta or a functional acid derivative thereof convertible to an ester of the alcohol reactant, and
         (2) 20–80 molar percent of at least one saturated aliphatic dicarboxylic acid of 4–12 carbon atoms or a functional acid derivative thereof convertible to an ester of the alcohol reactant, the improvement wherein the coating composition contains as a curing catalyst about 0.7–2.0% by weight of one or both of maleic acid and oxalic acid.

2. A coating composition according to Claim 1 containing about 1.0–1.5% by weight of the catalyst.

3. A coating composition according to Claim 1 containing maleic acid as the catalyst.

4. A coating composition according to Claim 3 containing about 1.0–1.5% by weight of the catalyst.

5. In a process for curing a coating composition containing, as the binder
   (A) 45–15% by weight of an aminoplast or a low-molecular precursor thereof; and
   (B) 55–85% by weight of at least difunctional esters containing predominantly hydroxyl groups and optionally carboxyl groups as the functional groups and having an average molecular weight of less than 600 and produced by the esterification of
      I. an alcohol reactant consisting essentially of:
         (1) 0–50 molar percent of one or more aliphatic polyols of 3 or 4 hydroxyl groups and 3–6 carbon atoms, and
         (2) 100–50 molar percent of a diol component consisting essentially of: (a) at least 70 molar percent of one or both of ethylene glycol and 1,2-propanediol, and (b) up to 30 molar percent of one or more other aliphatic or cycloaliphatic diols whose hydroxyl groups are separated by 2–8 carbon atoms, and 0 to 2 of the carbon atoms in the chain are substituted by oxygen atoms which are separated from each other and from the hydroxyl groups by at least 2 carbon atoms, and II. an acid mixture consisting essentially of:
(1) 80–20 molar percent of one or more aromatic or cycloaliphatic dicarboxylic acids whose carboxyl groups are positioned ortho or meta or a functional acid derivative thereof convertible to an ester of the alcohol reactant, and
(2) 20–80 molar percent of at least one saturated aliphatic dicarboxylic acid of 4–12 carbon atoms or a functional acid derivative thereof convertible to an ester of the alcohol reactant, the improvement which comprises employing as curing catalyst about 0.7–2.0% by weight of one or both of maleic acid and oxalic acid.

6. A process according to Claim 5 which comprises employing about 1.0–1.5% by weight of the catalyst.

7. A process according to Claim 6 wherein the catalyst is maleic acid.

8. A process according to Claim 7 which comprises employing about 1.0–1.5% by weight of the catalyst.

References Cited

UNITED STATES PATENTS

| | | | |
|---|---|---|---|
| 3,678,128 | 7/1972 | Riemhofer et al. | 260—850 |
| 3,691,258 | 9/1972 | Riemhofer et al. | 260—850 |
| 2,600,100 | 6/1952 | Evans et al. | 260—850 |
| 3,152,095 | 10/1964 | Tropp et al. | 260—850 |
| 2,918,452 | 12/1959 | Kun et al. | 260—850 |
| 2,871,209 | 1/1959 | Shelley | 260—850 |
| 2,683,100 | 7/1954 | Edgar et al. | 260—850 |

JOHN C. BLEUTGE, Primary Examiner

U.S. Cl. X.R.

117—124 E, 132 BF, 161 K, 161 LN; 260—39 R, 40 R, 75 T, 75 N